US008348708B2

(12) United States Patent
Kanerva (10) Patent No.: US 8,348,708 B2
(45) Date of Patent: Jan. 8, 2013

(54) ARTICULATED AMPHIBIOUS VEHICLE (76) Inventor: Ronald W. Kanerva, Sudbury (CA)

( * ) Notice: Subject to any disclaimer, the term of this patent is extended or adjusted under 35 U.S.C. 154(b) by 410 days.

(21) Appl. No.: 12/291,964

(22) Filed: Nov. 14, 2008

(65) Prior Publication Data
US 2009/0124143 A1 May 14, 2009

Related U.S. Application Data (60) Provisional application No. 60/987,938, filed on Nov. 14, 2007.

(51) Int. Cl.
B60F 3/00 (2006.01)
(52) U.S. Cl. ............ 440/12.63; 114/77 R; 180/9.1
(58) Field of Classification Search .......... 114/77 R; 180/9.1, 9.32, 9.4, 9.44, 9.5, 14.1; 440/12.5, 440/12.63, 52, 53, 12.51, 12.56
See application file for complete search history.

(56) References Cited

U.S. PATENT DOCUMENTS

| 3,473,619 | A | | 10/1969 | Dion |
| 3,521,720 | A | | 7/1970 | Korotkin |
| 3,842,785 | A | | 10/1974 | Rivet |
| 3,903,831 | A | | 9/1975 | Bartlett et al. |
| 3,951,093 | A | | 4/1976 | Poche |
| 4,000,712 | A | * | 1/1977 | Erikson et al. ............ 114/77 R |
| 4,072,203 | A | | 2/1978 | Pierson |
| 4,253,536 | A | | 3/1981 | Braathen |
| 4,645,023 | A | | 2/1987 | Rea et al. |
| 4,934,300 | A | * | 6/1990 | Seligman et al. .......... 440/12.56 |
| 5,113,958 | A | | 5/1992 | Holden |
| 5,632,221 | A | * | 5/1997 | Trenne et al. ............. 440/12.5 |
| 5,899,164 | A | | 5/1999 | Coast |
| 5,984,032 | A | | 11/1999 | Gremillion et al. |
| 6,582,258 | B2 | * | 6/2003 | Morin ....................... 440/12.63 |
| 7,063,580 | B1 | | 6/2006 | Birdwell |

FOREIGN PATENT DOCUMENTS

| CA | 2199910 | 3/1997 |
| CA | 2417944 | 8/2004 |
| EP | 1 000 778 A2 | 5/2000 |
| JP | 2003-137147 | 5/2003 |
| WO | WO9924272 | 5/1999 |

OTHER PUBLICATIONS

CA Examiner's Report, Mar. 9, 2011.

* cited by examiner

Primary Examiner — Lars A Olson
(74) Attorney, Agent, or Firm — Olson & Cepuritis, Ltd.

(57) ABSTRACT

An articulated amphibious vehicle includes a boat in the front and a rear propulsion unit pivotally connected by an articulation mechanism to the boat. The rear propulsion unit comprises an engine mechanically coupled to a pair of drive tracks for propelling the vehicle. Steering and throttle devices are provided in the boat to enable the operator to turn and power the rear propulsion unit, to thereby steer and control the vehicle. The articulated amphibious vehicle can travel over water, snow, ice, marsh, bogs, swamp, soft wet terrain or even hard terrain (preferably by adding wheels to the boat). Because it can traverse such a wide variety of environments, this "track boat" is more versatile than conventional air boats or conventional all-terrain vehicles.

16 Claims, 8 Drawing Sheets

ARTICULATED AMPHIBIOUS VEHICLE

CROSS-REFERENCE TO RELATED APPLICATIONS

This application claims the benefit of U.S. Provisional Application Ser. No. 60/987,938, filed on Nov. 14, 2007. The contents of this applications is hereby incorporated by reference in its entirety.

FIELD OF THE INVENTION

The present invention relates generally to vehicles and, more particularly, to amphibious vehicles.

BACKGROUND OF THE INVENTION

Amphibious off-road vehicles are all-terrain vehicles with hulls or watertight underbodies that are capable of traveling over land or water. Amphibious off-road vehicles are popular both as recreational vehicles, e.g. for hunters, fishermen and outdoorsmen, and as utility vehicles, e.g. for military and industrial applications.

For example, the ARGO which is manufactured by Ontario Drive and Gear Ltd. (220 Bergey Court, New Hamburg, Ontario, Canada, www.argoatv.com) is an amphibious off-road vehicle. The ARGO is currently available in a 6-wheel-drive version (6×6) and an 8-wheel-drive version (8×8). While the ARGO is adept on land, it is much less maneuverable in water.

In contrast, an air boat, with its flat-bottomed hull and air propeller, is specially designed to navigate through shallow swamps and marshes, or other bodies of water including frozen lakes or rivers. However, the air boat, unless of the hovercraft variety, is unsuited to travel over land.

A number of different designs for articulated amphibious vehicles are known in the art, such as, for example, those disclosed in U.S. Pat. No. 4,072,203 (Pierson) entitled "Small, Personal, All Terrain Vehicle", U.S. Pat. No. 5,113,958 (Holden) entitled "Snow Travel Vehicle", PCT Patent Application Publication WO 99/24272 (Francatel) entitled "Amphibious Cross-Country Vehicle In Two Articulated Parts, Whereof The Front Is The Steering Part", U.S. Pat. No. 4,645,023 (Rea et al.) entitled "All Terrain Vehicle and Method Of Operating Same", and European Patent Application EP 1 000 778 (Bellezza) entitled "Amphibious Vehicle With Articulated Sections". However, none of these various vehicles are particularly well-suited to traveling over both land and water, or through a wide variety of other environments such as swamps, bogs, marshes, ice and snow.

Therefore, it would be highly desirable to provide a vehicle capable of traveling over a wide variety of different environments, such as over water, snow, ice, marshes, bogs, swamps and dry land.

SUMMARY OF THE INVENTION

According to a main aspect of the present invention, a novel vehicle includes a boat (or boat-like front vehicular unit that may or may not have wheels or retractable wheels) and a rear propulsion unit connected by an articulation mechanism to the boat. The rear propulsion unit has an engine mechanically coupled to a drive track (or pair of parallel conjoined drive tracks) for propelling the vehicle.

According to another main aspect of the present invention, an articulated amphibious vehicle has a front vehicular unit having a hull, a space inside the hull for accommodating at least one person while providing access to steering and throttle devices for controlling the amphibious vehicle. The articulated amphibious vehicle has a rear propulsive unit pivotally connected to a rear portion of the front vehicular unit, the rear propulsive unit comprises an engine controlled by the throttle device and a drive track mechanically connected to the engine for propulsion of the articulated amphibious vehicle.

This articulated amphibious vehicle has been dubbed the "Track Boat" because it is an articulated vehicle having a track (or pair of drive tracks) in the rear and a boat (or amphibious-type vehicle) in the front. This articulated amphibious vehicle is capable of traveling over water, snow, ice, marsh, bogs, swamp, soft wet terrain or even hard terrain. For traversing hard terrain (such as gravel, rock, asphalt, etc.), it is preferable to add wheels to the hull of the boat to thus convert the boat into an amphibious-type vehicle. The front vehicular unit can also be an amphibious-type vehicle having retractable wheels. Because the articulated amphibious vehicle can traverse such a wide variety of environments, this "track boat" is more versatile than conventional air boats or conventional all-terrain vehicles.

Other features and advantages of the present invention will be better understood with reference to the preferred embodiment described hereinafter.

BRIEF DESCRIPTION OF THE DRAWINGS

Having thus generally described the nature of the present invention, reference will now be made to the accompanying drawings by way of illustration showing a preferred embodiment, in which.

DETAILED DESCRIPTION OF EMBODIMENTS

By way of introduction, and as will be elaborated below, the novel vehicle disclosed herein includes a boat and a rear propulsion unit connected by an articulation mechanism to the boat. The propulsion unit, as will be elaborated below, includes an engine mechanically coupled to a drive track for propelling the vehicle. As will be described below, this novel vehicle is an articulated amphibious vehicle comprising a front vehicular unit having a hull, a space inside the hull for accommodating at least one person while providing access to steering and throttle devices for controlling the amphibious vehicle. This articulated amphibious vehicle has a rear propulsive unit pivotally connected to a rear portion of the front vehicular unit. The rear propulsive unit comprises an engine controlled by the throttle device and a drive track mechanically connected to the engine for propulsion of the articulated amphibious vehicle. This novel vehicle, which has been dubbed the "Track Boat" (because it has a boat or boat-like vehicular unit in the front and a tracked propulsion unit in the rear) will now be described with reference to the various embodiments illustrated in FIGS. 1-14.

Figure 1:
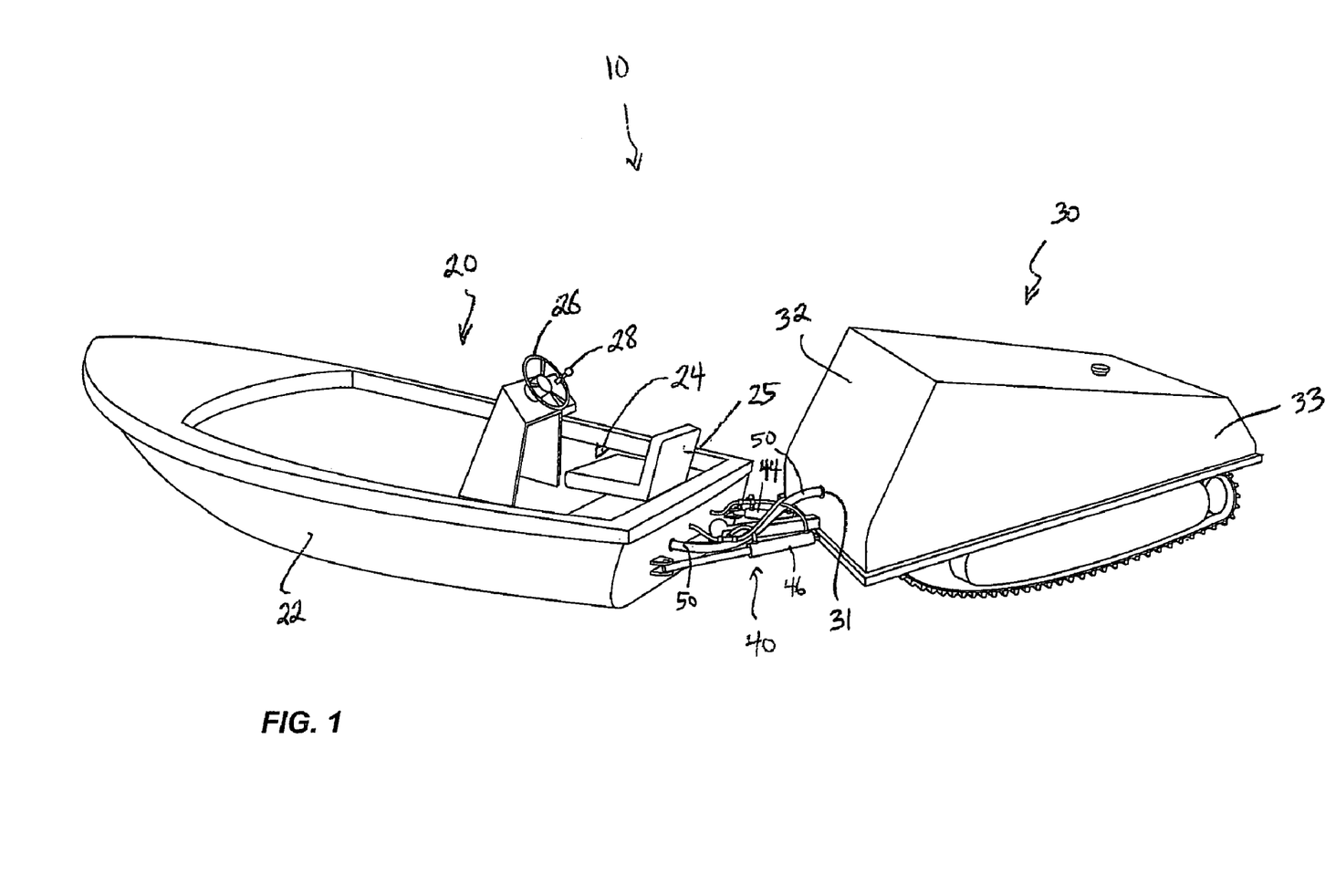
FIG. 1 is a perspective view of the articulated amphibious vehicle ("Track Boat") in accordance with a first embodiment of the present invention.

FIG. 1 is a perspective view of the articulated amphibious vehicle ("Track Boat") in accordance with a first embodiment of the present invention. The articulated amphibious vehicle, or Track Boat, is generally designated by reference numeral 10. The articulated amphibious vehicle, or Track Boat, includes two pivotally connected units designated by numerals 20, 30 that are articulated together by an articulation mechanism 40 to form the articulated vehicle 10. As depicted in FIG. 1, the articulated amphibious vehicle 10 includes a boat or boat-like front vehicular unit 20 (as a front unit for accommodating the operator/driver and optionally also one or more passengers) and a tracked rear propulsion unit 30 for powering the vehicle 10.

As depicted in FIG. 1, the boat 20 (or equivalent front vehicular unit) has a hull 22 and a space 24 inside the hull for accommodating at least one person while providing access to steering and throttle devices for controlling the amphibious vehicle. The space inside the boat may optionally include a seat 25. As will be described below, the steering device, e.g. steering wheel 26, and throttle device 28, can be disposed inside the boat 20 or, alternatively, can be disposed on the rear propulsion unit 30 in such as a way as to be reachable by the operator when sitting comfortably and safely in the boat. Where steering and throttle devices 26, 28 are disposed within the boat 20, suitable steering linkages/cables/lines (better shown in FIGS. 2 and 4) are routed from the boat to hydraulic actuators 44, 46 disposed in the articulation mechanism 40, as will be explained below with reference to FIG. 2. An engine control cable 50, also described with reference to FIG. 2, is routed from the throttle device 28 in the boat 20 to the rear propulsion unit 30, preferably via an aperture 31 in a front portion 32 of the cover 33 of the rear propulsion unit 30, as shown in FIG. 1.

Figure 2:
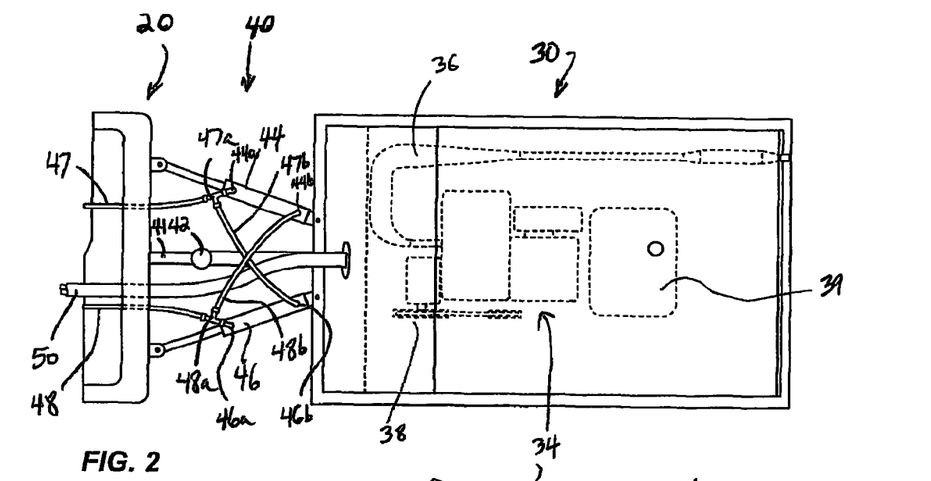
FIG. 2 is a top plan view of the rear propulsion unit and the articulation mechanism used to pivotally connect the rear propulsion unit to the rear of the boat in accordance with one embodiment of the present invention.

As depicted in the top plan view of FIG. 2, the rear propulsion unit 30 contains an engine 34, which is preferably a 2-cycle or 4-cycle internal combustion engine, for powering the articulated amphibious vehicle 10. Because of the articulation mechanism 40, the articulated amphibious vehicle 10 can be steered by turning the rear propulsion unit 30 relative to the boat (or front vehicular unit) 20.

FIG. 2 also shows details of the hydraulic system used to implement the articulation mechanism 40 in the main embodiments of this invention. As shown in FIG. 2, the articulation mechanism 40 connects the boat 20 to the rear propulsion unit 30 via a plurality of pivotally connected linkages. A centrally disposed linkage 41 includes a ball-joint coupling 42 (identical or similar to those used on a common trailer hitch) for providing a strong and reliable swivel connection.

Disposed on each side of the centrally disposed linkage 41 and ball-joint 42 are angled hydraulic actuators 44, 46. Each of the hydraulic actuators includes a piston that reciprocates within a respective cylinder. The piston rods of these actuators are pivotally connected to mounts on the rear portion of the boat or front vehicular unit whereas the opposite ends of the cylinders themselves are pivotally connected to the front portion of the rear propulsion unit. The two pivotally mounted hydraulic actuators 44, 46 and the ball-jointed central linkage 41 together constitute the articulation mechanism 40.

The hydraulics are configured such that turning of the steering wheel to the left (counterclockwise) causes the right-side (starboard-side) actuator 44 to push (lengthen) and the left-side (port-side) actuator 46 to pull (contract). For the sake of clarity, by "contract" and "lengthen", it is of course meant that the piston rod is either retracted or extended. Conversely, when the steering wheel is turned to the right (clockwise), the right-side actuator 44 pulls (contracts) while the left-side actuator 46 pushes (lengthens). This "opposed" or "inverted" hydraulic configuration therefore ensures that the two actuators work together to turn the rear propulsion unit when the steering device is turned.

This opposed/inverted hydraulic configuration can be accomplished by crisscrossing first and second hydraulic lines 47, 48, as shown in FIG. 2, so that one actuator pulls while the other pushes. These hydraulic lines 47, 48 are connected hydraulically to the steering device, e.g. steering wheel 26, so that turning of the steering wheel generates hydraulic pressure in the lines 47, 48 to "opposingly" actuate the hydraulic actuators 44, 46 in the articulation mechanism 40.

The first hydraulic line 47 is connected to a first T-joint or splitter 47a having one of its two outlets connected directly to a forward hole 44a in the cylinder body of the right-side actuator 44. A first downstream hydraulic line 47b, which is connected to the second of the two outlets of the splitter 47a, is connected to rearward hole 46b in the cylinder body of the left-side actuator 46. In a symmetrical fashion, the second hydraulic line 48 is connected to a second T-joint or splitter 48a having one of its two outlets connected directly to a forward hole 46a in the cylinder body of the left-side actuator 46. A second downstream hydraulic line 48b, which is connected to the second of the two outlets of the splitter 48a, is connected to rearward hole 44b in the cylinder body of the right-side actuator 44. It is noted that the first and second downstream hydraulic lines 47b, 48b "crisscross" each other to create the inverted or opposed hydraulic configuration.

As will be appreciated, other configurations or orientations of hydraulic actuators can be used to achieve similar results.

Also to be appreciated is that the hydraulic pressure generated by turning the steering wheel can be augmented using power steering. Furthermore, it should be understood that a pressurized pneumatic system could be used instead of a hydraulic system. Alternatively, a system of purely mechanical linkages (without fluid power) could be used to steer the rear propulsion unit.

As further depicted in FIG. 2, the engine control cable 50 extends through (or above) the articulation mechanism 40 from the throttle device of the boat to the engine 34 mounted in the rear propulsion unit 30.

Figure 3:
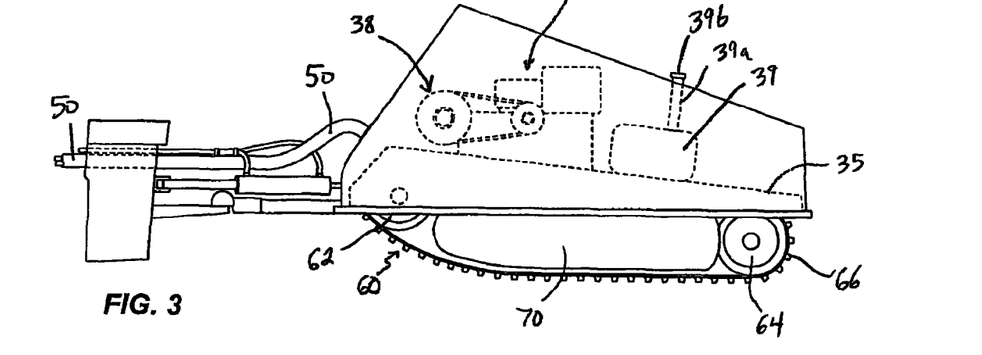
FIG. 3 is a left side elevational view of the rear propulsion unit and the articulation mechanism used to pivotally connect the rear propulsion unit to the rear of the boat in accordance with one embodiment of the present invention.

As depicted in the left side elevational view of FIG. 3, the rear propulsion unit 30 includes an engine 34, which, as noted above, is preferably a 2-stroke or 4-stroke internal combustion engine. Any small internal combustion engine for a snowmobile, personal watercraft or all-terrain vehicle can be used for this purpose. However, for marine applications, an engine that resists salt-water corrosion would be preferable. An example of a suitable salt-water resistant engine for this application would be the ROTAX 4-TEC watercraft engine, which is a supercharged three-cylinder intercooled engine that generates 215 hp. This personal watercraft engine would then have to be mated to the snowmobile's belt-drive transmission.

In the illustrated embodiment, this engine 34 is mounted to a snowmobile tunnel or pair of tunnels 35 (although it could also be mounted to any other equivalent frame or chassis). A pair of standard aluminum snowmobile tunnels is ideally suited for this purpose because these are already designed to mount an engine above drive tracks. As further depicted in FIG. 2 and FIG. 3, the rear propulsion unit includes, in addition to the engine 34, an exhaust pipe 36, a transmission 38 and a gas tank 39. A gas tank filler tube 39*a* and filler cap 39*b* are also shown in FIG. 3.

As further depicted in FIG. 3, the rear propulsion unit includes one or more drive tracks 60 which are mechanically coupled to the engine 34 via the transmission 38. A standard belt-driven snowmobile transmission can be used to transmit power from the engine to the drive track(s). The transmission mechanically couples the engine to one or more drive sprockets 62 (or cog wheels) that engage or mesh with the drive track. The drive track circulates around idler wheels 64 provided as shown. The drive track 60 can be made of fabric-reinforced natural or synthetic rubber. Usually, several layers of rubber are reinforced with fabric and polyester cord. The tracks are typically further reinforced with embedded stiffener rods, or reinforcing rods, which traverse the width of the track to provide bending resistance as is well known in the art. On the outer surface of the track 60, a plurality of ground-engaging lugs 66 (also known in the art as "cleats", "ribs" "paddles", or "profiles") are integrally formed with the base of the track 60. These ground-engaging lugs 66 provide traction, particularly in snow, but also over ice, dry hard terrain, mud, and other ground types, as is well known in the art. The lugs 66 furthermore create a "paddle-wheel effect" to propel the vehicle through water.

As further depicted in FIG. 3, the rear propulsion unit 30 includes a flotation device 70, such as for example, foam. The foam can be inserted beneath the tunnel in the interior space defined by the track. Foam flotation devices can also be attached to the sides of the rear propulsion unit to provide the desired buoyancy for a given overall mass of the rear propulsion unit.

Figure 4:
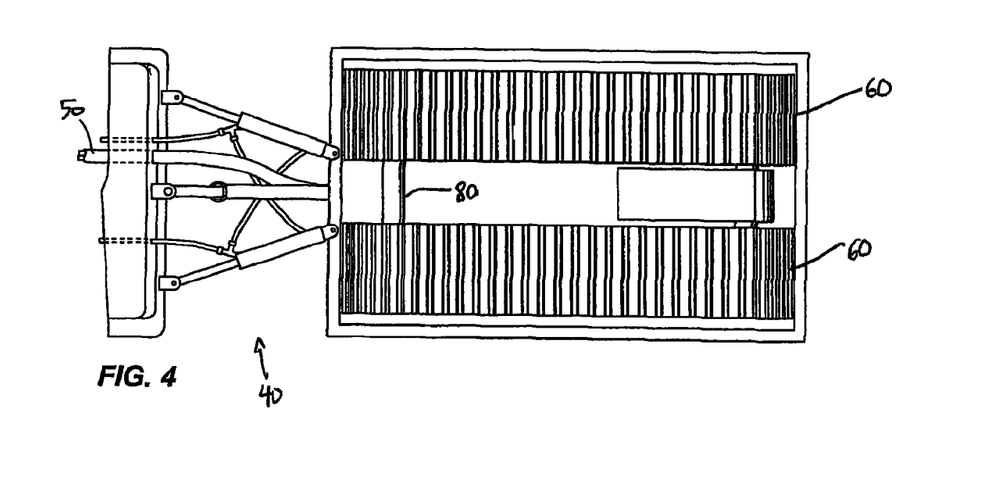
FIG. 4 is a bottom plan view of the rear propulsion unit and the articulation mechanism used to pivotally connect the rear propulsion unit to the rear of the boat in accordance with one embodiment of the present invention.

In the preferred implementation, there are two side-by-side ("parallel") drive tracks 60, as depicted in the bottom plan view of FIG. 4. As shown in FIG. 4, these two parallel drive tracks 60 are conjoined by a common drive shaft 80. The common drive shaft 80 connects to drive sprockets on both drive tracks 60. The transmission 38 drives the common drive shaft so that both drive tracks 60 move at the same speed. The use of two side-by-side drive tracks 60 improves overall traction and propulsion. Although the preferred implementation entails two drive tracks, it should be appreciated that variants of this vehicle having only one drive track or, alternatively, having three or more drive tracks are also possible (and thus lie within the scope of the present invention).

The vehicle described with reference to FIGS. 1-4 has a boat in the front, which is ideally suited for traversing water, snow and ice. For traversing dry hard terrain, such as gravel, dirt, rock or asphalt, the boat can be modified by adding wheels to it to form a truly amphibious front vehicular unit. A four-wheeled variant is presented in FIGS. 5 and 6. An eight-wheeled variant is presented in FIGS. 7 and 8. As will be appreciated, a six-wheeled version would also be possible, as would, theoretically a version with any other number of wheels.

Figure 5:
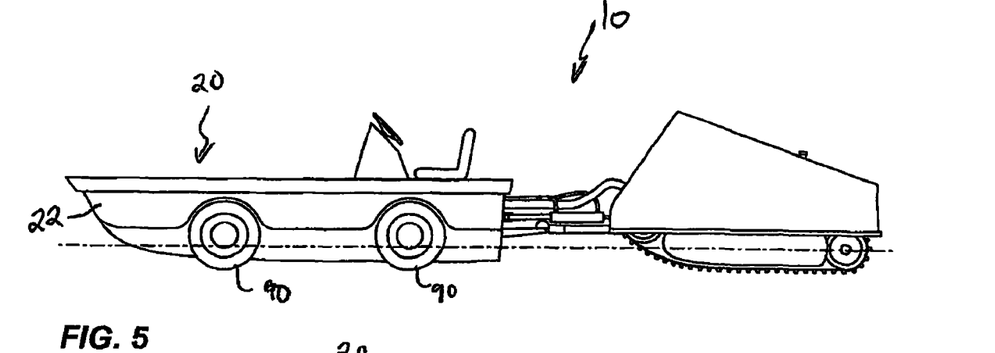
FIG. 5 is a left side elevational view of a four-wheel articulated amphibious vehicle ("Track Boat") in accordance with a second embodiment of the present invention.
Figure 6:
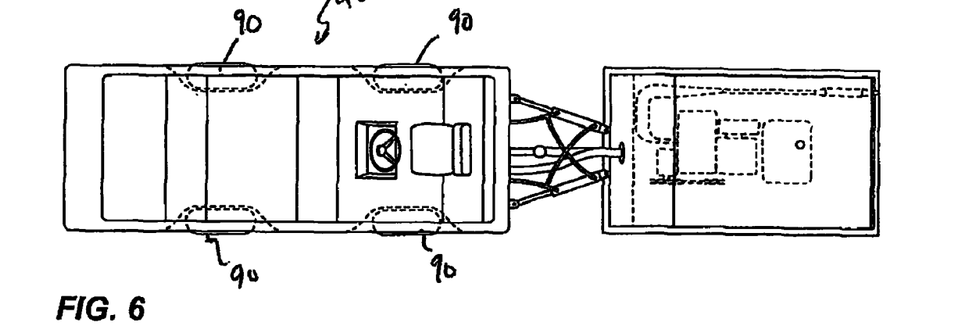
FIG. 6 is a top plan view of the vehicle shown in FIG. 5.

FIGS. 5 and 6 illustrate a four-wheel articulated amphibious vehicle ("Track Boat") 10 in accordance with a second embodiment of the present invention. The front vehicular unit 20 has four wheels 90. These wheels can be rotationally mounted to the hull 22. The hull 22 can be modified, as shown in FIG. 5, to have wheel wells. Optionally, the wheels 90 can be retractable. Preferably, these wheels 90 are idle (free-rolling), i.e. there is no power supplied to any of them (since all power is provided by the tracked rear propulsion unit). In a variant, however, the front vehicular unit 20 could include a separate engine for driving one or more of the wheels 90. In another variant, one or more of the wheels 90 could be driven by the engine of the rear propulsion unit via a universally jointed drive shaft extending from the rear-mounted engine to the axles supporting these wheels. These variants are merely mentioned to illustrate that the embodiments shown can be modified in many different ways within the scope of the present invention.

Figure 7:
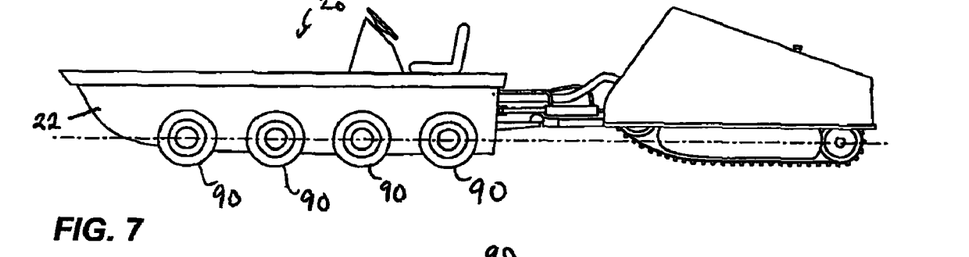
FIG. 7 is a left side elevational view of an eight-wheel articulated amphibious vehicle ("Track Boat") in accordance with a third embodiment of the present invention.
Figure 8:
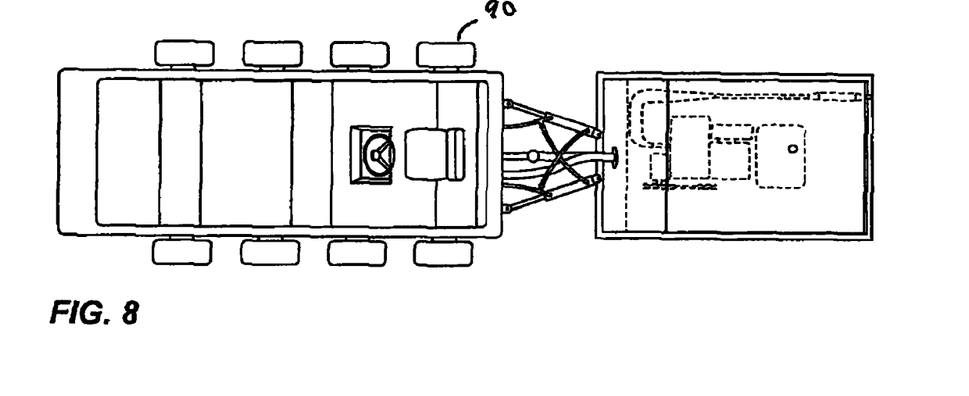
FIG. 8 is a top plan view of the vehicle shown in FIG. 7.

FIGS. 7 and 8 illustrate an eight-wheel articulated amphibious vehicle ("Track Boat") 10 in accordance with a third embodiment of the present invention. In this embodiment, the eight wheels 90 are rotationally mounted to the hull 22 without any wheel wells. These eight wheels can optionally be retractable. The presence of wheel wells formed in the hull is also optional, and depends on the shape of the hull and the extent to which the wheels are mounted outwardly from the sides of the hull.

In the foregoing embodiments, a steering wheel 26 is shown as the steering device. Also shown in the foregoing embodiments is a throttle lever 28 which allows the user/operator to control the engine by regulating airflow into the engine. It should be appreciated that other steering or throttle devices can be used instead of a steering wheel 26 and throttle lever 28. For example, instead of a steering wheel 26, the boat could have handlebars, a control yoke, etc. The throttle lever 28 could be replaced with an accelerator pedal or a hand-twistable throttle device placed directly on the handlebars, as found on many personal watercraft or jet skis.

Figure 9:
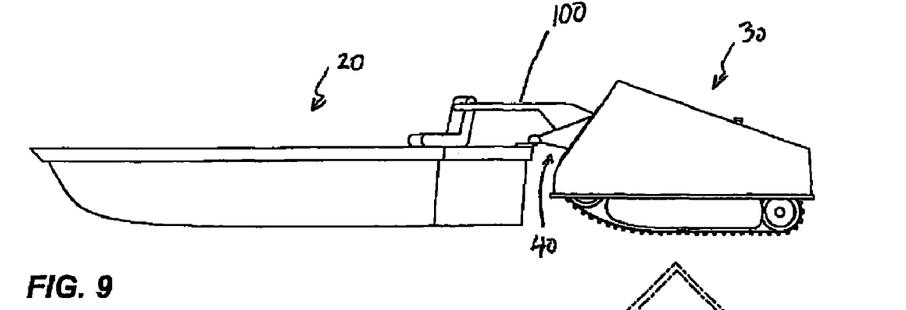
FIG. 9 is a left side elevational view of the articulated amphibious vehicle ("Track Boat") having a steering lever arm in accordance with a fourth embodiment of the present invention.

FIG. 9 is a left side elevational view of the articulated amphibious vehicle ("Track Boat") having a steering lever arm or "tiller" 100 in accordance with a fourth embodiment of the present invention. The tiller 100 can be pivoted (about an upright post or stem) to turn the rear propulsion unit. Using a tiller, the rear unit can be turned through a substantial range of motion as shown in the top plan view of FIG. 10. This tiller design is particularly applicable for small/light rear propulsion units 30 where the leverage required to turn the vehicle is acceptably low. The tiller 100 can have a twist throttle on the tiller's arm, for example, to enable the operator to control engine speed.

Figure 10:
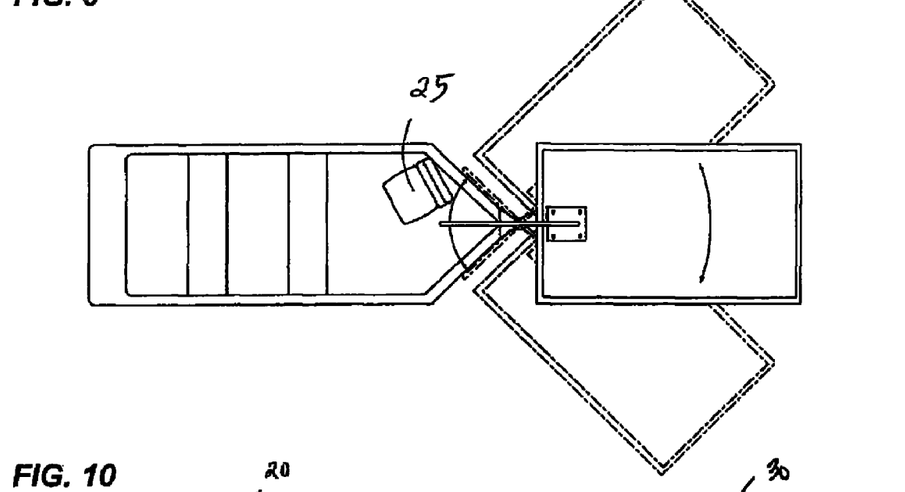
FIG. 10 is a top plan view of the vehicle shown in FIG. 9.

FIG. 10 also depicts how the seat 25 may optionally be relocated in an offset position to provide better ergonomics for the operator. The tiller embodiment shown in FIG. 9 and FIG. 10 is one example of a variant of this articulated amphibious vehicle 10 in which the steering and throttle devices are not mounted to the boat or front vehicular unit 20. However, to enable safe and ergonomic enjoyment of the vehicle, the steering and throttle devices should be at least readily accessible from the boat or front unit 20. In other words, the operator or driver of the vehicle should be able to easily reach or access the steering and throttle devices that are disposed on or mounted to the rear propulsion unit. Accordingly, the seating (or whatever space inside the hull is used to accommodate the operator) should provide easy and comfortable access to the steering and throttle devices for controlling the amphibious vehicle.

Figure 11:
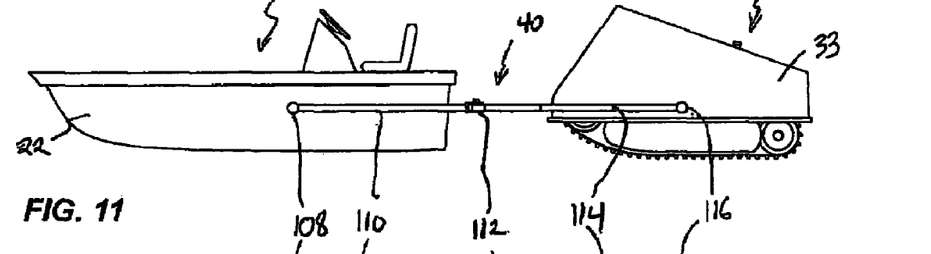
FIG. 11 is a left side elevational view of the articulated amphibious vehicle ("Track Boat") having a U-shaped harness in accordance with a fifth embodiment of the present invention.
Figure 12:
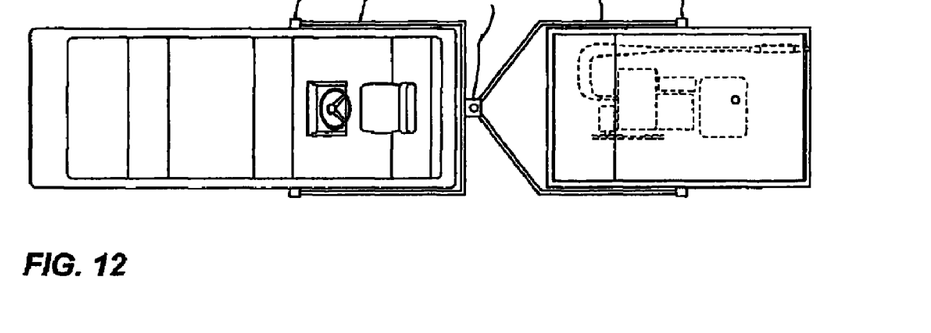
FIG. 12 is a top plan view of the vehicle shown in FIG. 11.

FIGS. 11 and 12 illustrate a variant of the articulated amphibious vehicle ("Track Boat") having one or more U-shaped harnesses in accordance with a fifth embodiment of the present invention. As depicted in these two figures, this particular version of the vehicle includes a front U-shaped harness 110 (that is pivotally connected to left and right sides of the hull 22 of the boat 20 at forward pivot points 108) and a rear U-shaped harness 114 (that is pivotally connected to left and right sides of the cover 33 of the rear propulsion unit 30 at rear pivot points 116). The front and rear U-shaped harnesses 110, 114 are joined to one another via universal joint 112, or "U-joint", as shown in these figures. These U-shaped harnesses and U-joint form part of the articulation mechanism 40. Intentionally absent from these two drawings (FIGS. 11 and 12) are the hydraulic actuators or tiller required to actually turn the rear unit 30 relative to the front unit 20. These harnesses or "bridges" swivel about the front and rear pivot points 108, 116, thus correcting and adjusting the horizontal attitude particularly in situations where the articulated vehicle is floating. Controlling the attitude or pitch of the front and rear units is important for providing optimal comfort and performance.

Figure 13:
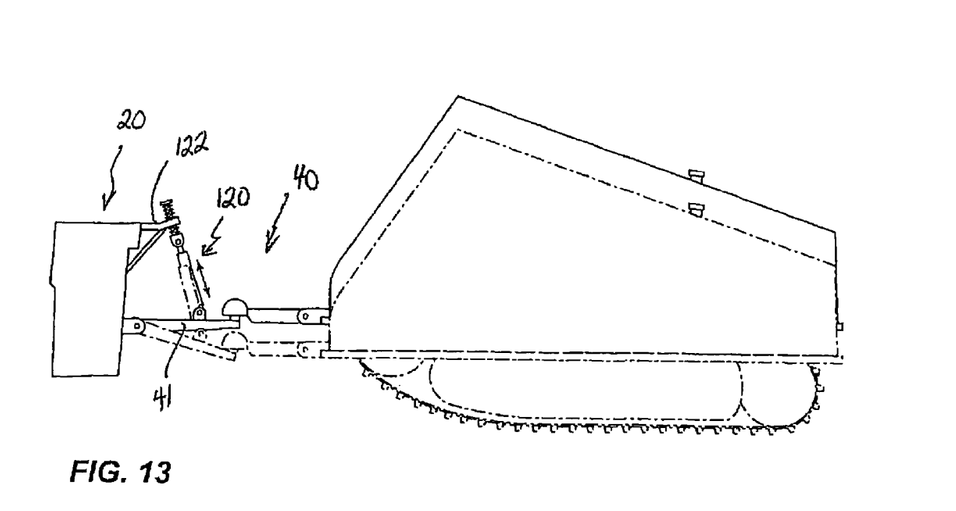
FIG. 13 is a left side elevational view of the articulated amphibious vehicle ("Track Boat") having a trim actuator in accordance with a sixth embodiment of the present invention.

FIG. 13 is a left side elevational view of the articulated amphibious vehicle ("Track Boat") having a trim actuator 120 to compensate for variable loading of the boat in accordance with a sixth embodiment of the present invention. As shown in the embodiment presented in FIG. 13, the trim actuator 120 can be mounted between a bracket 122 affixed to the rear portion of the boat 20 and the central linkage 41. In variants, the trim actuator 120 could be mounted between other components to cause relative vertical height adjustment of the rear unit relative to the front unit. The trim actuator is particularly useful when the boat or front unit 20 is heavily loaded, in which case the low-sitting boat causes the front of the propulsion unit to dip (i.e. to incline forward). This reduces the amount of propulsive force that can be generated by the rear unit 30 because the drive track is no longer properly aligned to scoop and throw water above the waterline. Maximum thrust is achieved when the greatest number of lugs on the track are in contact with the water such that the water that is ejected rearwardly is thrown into the air, i.e. above the waterline. If the front of the propulsion unit dips too much, this optimal orientation is lost and thrust is accordingly diminished.

Figure 14:
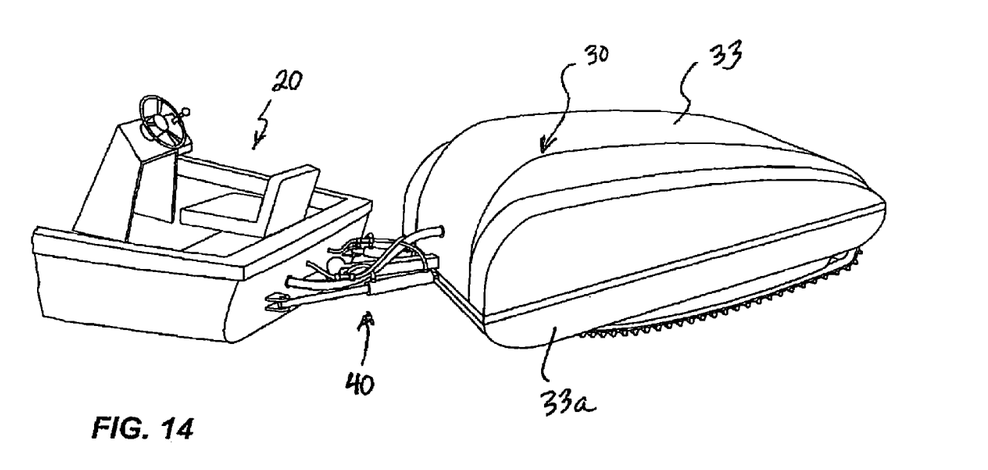
FIG. 14 is a view of an aerodynamic rear propulsion unit in accordance with a seventh embodiment of the present invention.

FIG. 14 is a view of an aerodynamic rear propulsion unit in accordance with a seventh embodiment of the present invention. In this embodiment, the cover 33 is shaped to be more aerodynamic. Optional side skirts 33a (with foam flotation panels or other foam-based flotation material inside) can be added for improved aerodynamics or styling, as desired. Although it is not shown in FIG. 14 or any of the other figures, the cover 33 should have a suitable hood or access panel to enable a person to perform repairs or regular maintenance not only on the engine (e.g. add oil to a four-stroke engine, change filters, etc.) but also on the other components of the propulsion unit 30 (e.g. the transmission). This access panel or hood should ideally by accessible from the boat so that the operator, who is floating on water, can perform at least certain rudimentary repairs or maintenance tasks by leaning over from the boat.

The various embodiments of the novel vehicle 10 described above represent variations on the basic Track Boat. In each of these embodiments there is at least a tracked drive unit or "power unit" that is articulated to the boat-like front vehicular unit. This innovative configuration enables the vehicle to travel efficiently over a wide variety of surfaces and environments, such as water, snow, ice, mud, bogs, swamps, and dry land. The Track Boat's adeptness and versatility in such a wide variety of surface environments is believed to far exceed the capabilities of airboats, amphibious all-terrain vehicles and all the articulated off-road vehicles that are known in the art. As noted earlier, a wheeled version of the front vehicular unit is preferred for travel over hard, dry land.

Accordingly, this innovative vehicle can be used as a recreational vehicle by, for example, hunters, fishermen, outdoorsmen, eco-tourists, or individuals wishing to access their camp or cottage in early spring when the ground is wet and generally impassable. This innovative vehicle can also be used as a utility vehicle by, for example, the military, law enforcement or rescue units. For example, this versatile new vehicle would have been very useful for rescue operations following Hurricane Katrina where low-lying areas were inundated and it was necessary to traverse water, swamps and land to rescue stranded civilians.

Figure 15:
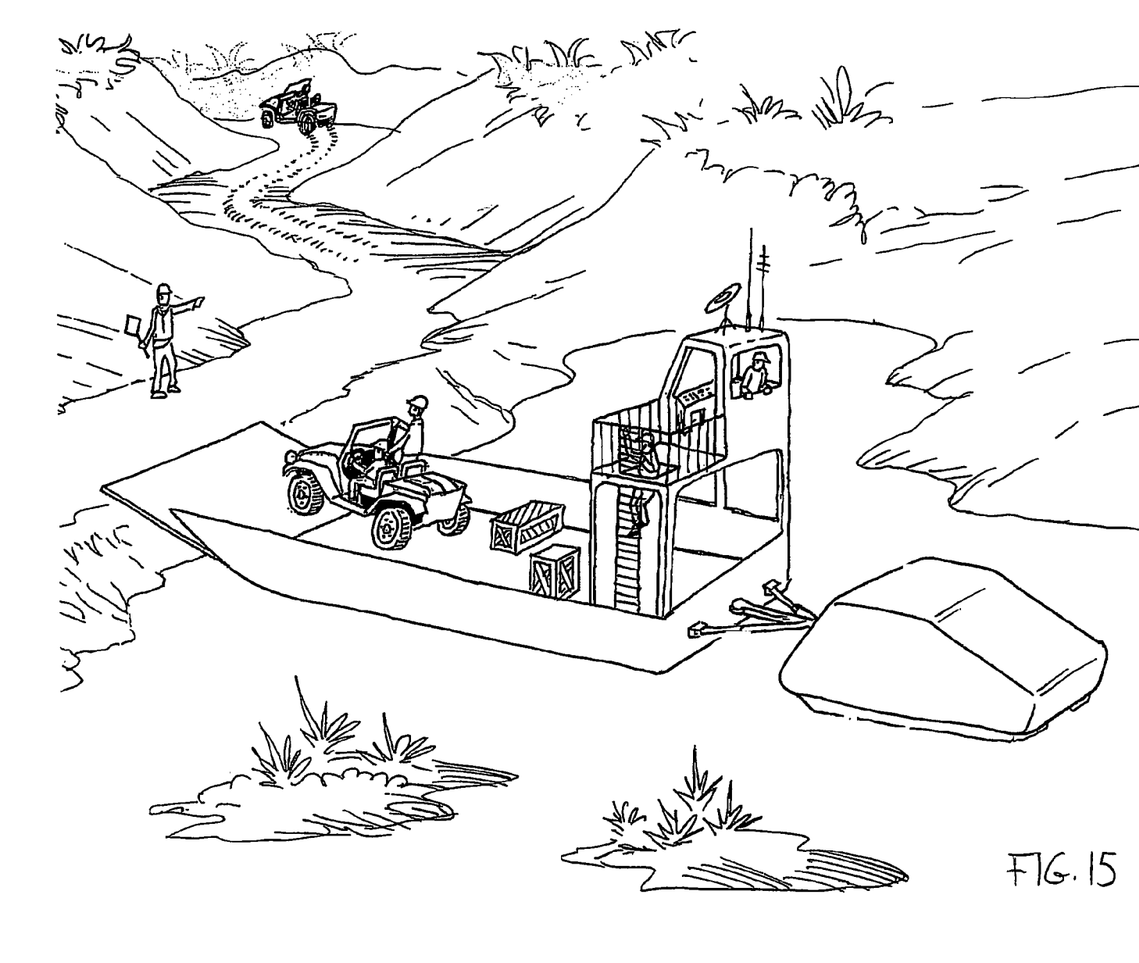
FIG. 15 is a perspective view of a track boat used as a ferry boat for delivering all-terrain vehicles.
Figure 16:
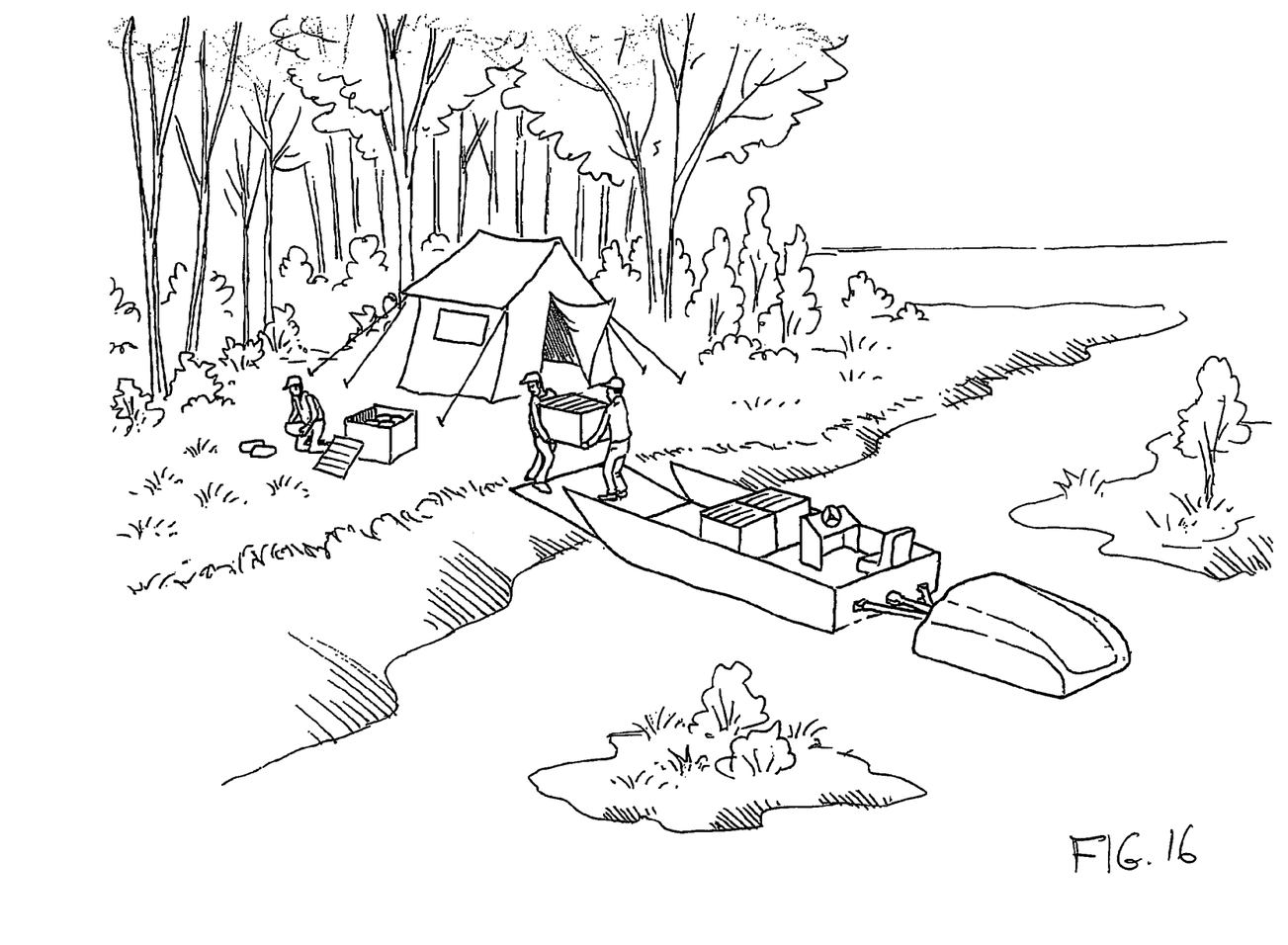
FIG. 16 is a perspective view of a track boat with a front loading ramp for delivering supplies to a campsite.
Figure 17:
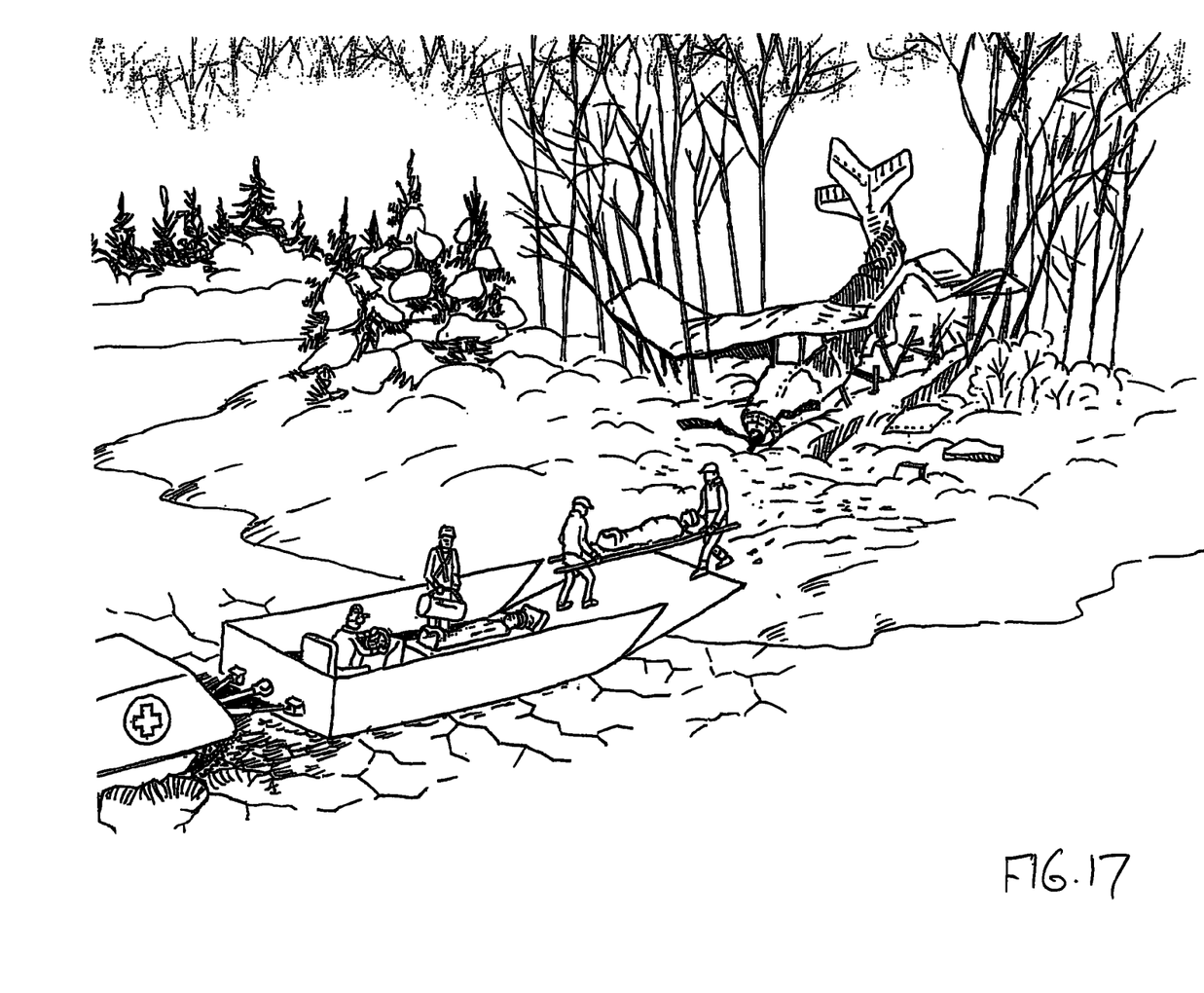
FIG. 17 is a perspective view of a track boat with a front loading ramp for rescue and medical evacuation operations.

For example, FIG. 15 is a perspective view of a larger scale track boat used as a ferry boat for delivering all-terrain vehicles to a remote (and hard-to-access) location. As another example, FIG. 16 is a perspective view of a track boat with a front loading ramp for delivering supplies to a campsite. As another example, FIG. 17 is a perspective view of a track boat with a front loading ramp for rescue and medical evacuation operations.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

The invention claimed is:

1. A vehicle comprising:
 a boat;
 only a single engine for providing all power for the vehicle; and
 a rear propulsion unit pivotally connected by an articulation mechanism to the boat for steering the vehicle, wherein the rear propulsion unit comprises the engine and a drive track mechanically coupled to the engine for propelling the vehicle, the rear propulsion unit providing all propulsion for the vehicle, and wherein the engine provides power only to the rear propulsion unit.

2. The vehicle as claimed in claim 1 wherein the propulsion unit comprises a pair of parallel drive tracks having a common drive shaft driven by a single internal combustion engine mounted on the rear propulsion unit.

3. The vehicle as claimed in claim 2 wherein the articulation mechanism comprises a pair of pivotally mounted hydraulic actuators for turning the propulsion unit to thereby steer the vehicle.

4. The vehicle as claimed in claim 3 wherein the boat comprises wheels rotationally mounted to the hull of the boat for traversing hard terrain.

5. The vehicle as claimed in claim 4 wherein the articulation mechanism comprises a trim mechanism for adjusting the trim of the rear propulsion unit to compensate for variable loading of the boat.

6. The vehicle as claimed in claim 1 wherein the articulation mechanism comprises a pair of pivotally mounted hydraulic actuators for turning the propulsion unit to thereby steer the vehicle.

7. The vehicle as claimed in claim 1 wherein the boat comprises wheels rotationally mounted to the hull of the boat for traversing hard terrain.

8. The vehicle as claimed in claim 1 wherein the articulation mechanism comprises a trim mechanism for adjusting the trim of the rear propulsion unit to compensate for variable loading of the boat.

9. An articulated amphibious vehicle comprising:
a front vehicular unit having a hull, a space inside the hull for accommodating at least one person while providing access to steering and throttle devices for controlling the amphibious vehicle;
only a single engine for providing all power for the vehicle, the engine being controlled by the throttle device; and
a rear propulsive unit pivotally connected to a rear portion of the front vehicular unit, wherein the rear propulsive unit comprises the engine and a drive track mechanically connected to the engine for providing all propulsion for the articulated amphibious vehicle, wherein the engine provides power only to the rear propulsive unit.

10. The amphibious vehicle as claimed in claim 9 wherein the rear propulsive unit comprises a pair of parallel drive tracks having a common drive shaft driven by the engine.

11. The amphibious vehicle as claimed in claim 9 comprising a pair of pivotally mounted hydraulic actuators that can be hydraulically actuated by turning the steering device in order to turn the rear propulsive unit.

12. The amphibious vehicle as claimed in claim 9 wherein the front vehicular unit comprises wheels rotationally mounted to the hull for traversing hard terrain.

13. The amphibious vehicle as claimed in claim 9 further comprising a trim mechanism connected between a rear portion of the front vehicular unit and a linkage pivotally connecting the front vehicular unit to the rear propulsive unit, the trim mechanism being adjustable to adjust the trim of the rear propulsive unit in order to compensate for variable loading of the front vehicular unit.

14. The amphibious vehicle as claimed in claim 9 wherein the rear propulsive unit is pivotally connected to the rear portion of the front vehicular unit via a ball-joint.

15. The amphibious vehicle as claimed in claim 14 wherein the rear propulsive unit is further pivotally connected to the rear portion of the front vehicular unit via a pair of angled, pivotally-connected hydraulic actuators.

16. The amphibious vehicle as claimed in claim 15 wherein the hydraulic actuators are connected via hydraulic hoses to the steering device for manually steering the vehicle.

* * * * *